Patented Dec. 5, 1950

2,532,622

UNITED STATES PATENT OFFICE 2,532,622

ORGANO SILICON DERIVATIVES OF CELLULOSE

Melvin J. Hunter, Midland, Mich., assignor to Dow Corning Corporation, Midland, Mich., a corporation of Michigan No Drawing. Application February 23, 1949, Serial No. 77,991

5 Claims. (Cl. 260—215)

This invention relates to organo silicon derivatives of cellulose.

Cellulose products prepared from the esters and ethers of cellulose have found wide applications for many industrial and domestic uses. However, it is desirable to improve the thermal stability, dielectric strength and hydrofobicity of cellulose products.

It is an object of this invention to prepare cellulose derivatives containing triorgano silyl groups which products will possess improved thermal stability, dielectric strength and moisture resistance. Another object of this invention is to prepare organo silicon materials which may be employed to fabricate sheet materials such as free films. Other objects and advantages will be apparent from the following description.

This invention relates to a composition of matter consisting essentially of triorgano silyl derivatives of cellulose wherein there is on the average from 0.25 to 2 triorgano silyl groups per glucose unit. The triorgano silyl groups are of the type ($R_2R'Si$—) where R is an aryl hydrocarbon radical and R' is an aryl hydrocarbon or alkyl radical. The silicon atoms of said groups are attached through an oxygen atom to a carbon atom of a glucose unit which carbon atom would normally carry a hydroxyl group.

In the triorgano silyl groups R is an aryl hydrocarbon radical such as phenyl, xenyl, tolyl, xylyl and naphthyl while R' may be either an aryl hydrocarbon radical or a lower alkyl radical containing less than five carbon atoms such as methyl, ethyl, propyl and butyl, or a higher alkyl radical such as amyl, hexyl, octyl, dodecyl and octadecyl.

Partially esterified or etherified cellulose in which there is on the average from 1 to 2.75 ester or ether groups per glucose unit may be employed to prepare the compounds of this invention. The cellulose esters include, for example, cellulose nitrate, cellulose acetate and cellulose p-toluenesulphonate. The cellulose ethers include, for example, methyl cellulose, ethyl cellulose, propyl cellulose, butyl cellulose, benzyl cellulose, allyl cellulose, hydroxy ethyl cellulose, the glycolic acid ether of cellulose and the triphenyl carbinyl ether of cellulose.

Triorgano silyl derivatives of cellulose may be prepared by reacting the above defined cellulose ethers or esters with a triorgano silicon halide of the type $R_2R'SiX$ where X is a halogen atom. Such a reaction may be carried out in any appropriate manner. The reaction proceeds by means of a condensation between the hydroxyl groups of the cellulose and the halogen of the silane whereby the triorgano silyl group is linked to oxygen of the hydroxyl group with the concurrent splitting out of a hydrogen halide. The reaction may be represented schematically as

$\equiv COH + XSiR_2R' \equiv COSiR_2R' + HX$.

Reaction between the cellulose and the silicon halide proceeds smoothly at room temperature and is preferably carried out in the presence of a hydrogen halide acceptor such as pyridine, ammonia, piperidine or other amino compounds.

A specific method for preparing the compounds of this invention is to add a pyridine solution of the silicon halide to a suspension of a cellulose ether or ester in pyridine. Reaction proceeds smoothly at room temperature as is shown by the complete solution of the cellulose product and precipitation of pyridine hydrochloride. The organo silicon cellulose product may be precipitated by mixing the pyridine solution with a hydroxyl containing solvent such as water and alcohols. The precipitated product may then be washed free of impurities and is ready for use in the fabrication of molded, extruded and cast articles.

Free films may be prepared by dissolving the organo silicon cellulose derivative in a suitable solvent such as aromatic hydrocarbons and ethers, pouring or doctoring the solution thus obtained on a smooth surface and allowing the solvent to evaporate. The resulting film may then be stripped from the surface. Such films are transparent, flexible and tough. They possess good dielectric strength, thermal stability and resistance to moisture and therefore are useful in a wide variety of applications. These include insulation of electrical equipment, films for packaging, sheet materials and various kinds of molded and extruded articles. If desired additives such as pigments, fillers and finely divided dielectric solids may be included in the compositions of this invention by adding them to a solution of the latter and then evaporating the solvent.

In order that those skilled in the art may better understand this invention, recourse should be had to the following examples which should be considered as illustrative only.

EXAMPLES

Example 1

One g. of methyl cellulose containing 1.7 methoxy groups per glucose unit, was suspended in 20 cc. of pyridine. The methyl cellulose swelled in the solvent to form a soft, gel-like paste.

A solution of 1.6 g. of triphenylchlorosilane in 15 cc. of pyridine was added to the paste. Reaction proceeded at once to produce a clear, viscous solution of the methyl cellulose silane reaction product. The viscous solution was allowed to stand for two days and then was poured into dilute hydrochloric acid and washed with water until neutral. The resulting viscous mass was dissolved in benzene. The benzene solution was spread on a glass plate and the solvent was allowed to evaporate. The resulting residue was stripped from the plate to give a transparent, flexible, tough film. The film was analyzed for silicon. Found: Si=5.65 percent—calculated: Si=5.58 percent. This product contained 1.3 triphenylsilyl groups per glucose unit. The film had a dielectric strength of 4000 volts per mil. After 48 hours at 148° C. the dielectric strength was 4200 volts per mil.

*Example 2*

15 g. of triphenylchlorosilane was dissolved in 100 cc. of pyridine. The solution was added to a suspension of methyl cellulose, containing 1.7 methoxy groups per glucose unit, in 100 cc. of pyridine. Pyridine hydrochloride precipitated. The reaction mixture was poured into one liter of ethanol whereupon the methyl cellulose silane reaction product precipitated. The precipitated reaction product was dissolved in acetone and again precipitated with ethyl alcohol. The precipitate was washed with methanol and dried in air. It was then dissolved in benzene, filtered and the benzene solution was spread upon a glass plate. Upon evaporation of the solvent the transparent residue was stripped from the plate to give a flexible, tough film.

*Example 3*

15 g. of ethyl cellulose having 2.4 ethoxy radicals per glucose unit, was suspended in 100 cc. of pyridine. A gel-like mass resulted. 15 g. of diphenylethylchlorosilane in 25 cc. of pyridine was added to the cellulose suspension. After standing overnight a clear, homogeneous solution was obtained. The pyridine was poured into water whereupon the cellulose product precipitated. The product was dissolved in acetone and precipitated by adding the solution to 95 percent ethanol. The precipitate was washed with methanol and allowed to dry in air. The residue was dissolved in toluene, centrifuged and then cast into a film. The film was analyzed for silica and found to contain 5.44 percent Si. A sample of the film was unchanged after submersion in water at room temperature for 10 days.

*Example 4*

When cellulose acetate containing two acetyl groups per glucose unit is suspended in pyridine and reacted with triphenylchlorosilane in amount of one triphenylsilyl group per glucose unit, in the manner of Example 3, a viscous product is obtained. This material is suitable for making sheet material.

*Example 5*

When methyl cellulose containing 1.5 methoxy groups per glucose unit is reacted with methyldiphenylchlorosilane in amount of 1.5 methyldiphenylsilyl groups per glucose unit, in accordance with the method of Example 3 a viscous product is obtained. This material is suitable for making sheet materials.

That which is claimed is:

1. A cellulose derivative selected from the group consisting of cellulose ethers and cellulose esters having from 1 to 2.75 ether and ester groups per glucose unit and in which derivative there are from 0.25 to 2 triorganosilyl radicals per glucose unit, said radicals being ($R_2R'Si-$) where R is an aryl radical and R' is selected from the group consisting of aryl and alkyl radicals, the silicon atoms of said organosilyl radicals being attached through an oxygen atom to a carbon atom of a glucose unit, which carbon atom would normally carry a hydroxyl group.

2. A composition of matter consisting essentially of a cellulose ether in which there is from 1 to 2.75 alkoxy radicals per glucose unit and in which ether there is from 0.25 to 2 triorgano silyl radicals per glucose unit, said triorgano silyl radicals being ($R_2R'Si-$) where R is an aryl radical and R' is selected from the group consisting of aryl and alkyl radicals, the silicon atoms of said organo silyl groups being attached through an oxygen atom to a carbon atom of a glucose unit which carbon atom would normally carry a hydroxyl group.

3. A composition of matter in accordance with claim 2 wherein the triorgano silyl groups are triphenyl silyl groups.

4. A composition of matter in accordance with claim 2 wherein the triorgano silyl groups are diphenylethyl silyl groups.

5. A composition of matter in accordance with claim 2 wherein the triorgano silyl groups are diphenylmethyl silyl groups.

MELVIN J. HUNTER.

REFERENCES CITED

The following references are of record in the file of this patent:

UNITED STATES PATENTS

| Number | Name | Date |
|---|---|---|
| 2,030,737 | Bley | Feb. 11, 1936 |
| 2,258,222 | Rochow | Oct. 7, 1941 |
| 2,306,222 | Patnode | Dec. 22, 1942 |
| 2,390,370 | Hyde | Dec. 4, 1945 |

OTHER REFERENCES

Schuyten et al.: Journal Amer. Chem. Soc., vol. 69, Sept. 1947, pages 2110–2112.

Schuyten et al.: ibidum, vol. 70, 1948, pages 1919–1920.